(12) United States Patent
Lawrence

(10) Patent No.: US 9,894,892 B2
(45) Date of Patent: Feb. 20, 2018

(54) AGRICULTURAL CROP APPLICATION SYSTEM

(71) Applicant: Rick Eugene Lawrence, Blue Earth, MN (US)

(72) Inventor: Rick Eugene Lawrence, Blue Earth, MN (US)

(*) Notice: Subject to any disclaimer, the term of this patent is extended or adjusted under 35 U.S.C. 154(b) by 0 days.

(21) Appl. No.: 15/348,672

(22) Filed: Nov. 10, 2016

(65) Prior Publication Data

US 2017/0055514 A1 Mar. 2, 2017

Related U.S. Application Data

(63) Continuation of application No. 14/931,842, filed on Nov. 3, 2015.

(60) Provisional application No. 62/074,217, filed on Nov. 3, 2014.

(51) Int. Cl.

| | |
|---|---|
| *B05B 1/20* | (2006.01) |
| *A01M 7/00* | (2006.01) |
| *B05B 13/00* | (2006.01) |
| *B05B 15/06* | (2006.01) |
| *A01C 23/00* | (2006.01) |

(52) U.S. Cl.
CPC ......... *A01M 7/0053* (2013.01); *A01C 23/008* (2013.01); *A01M 7/00* (2013.01); *B05B 1/20* (2013.01); *B05B 13/005* (2013.01); *B05B 15/065* (2013.01)

(58) Field of Classification Search
CPC .. A01M 7/0053; A01M 7/0057; A01M 7/005; A01M 7/00; B05B 13/005; B05B 1/20; B05B 15/065; A01C 23/008

USPC .................................................. 239/146–176
See application file for complete search history.

(56) References Cited

U.S. PATENT DOCUMENTS

| 1,526,642 A * | 2/1925 | Nissley | A01M 7/005 |
| | | | 239/164 |
| 2,169,948 A * | 8/1939 | Gallupe | A01M 7/0053 |
| | | | 239/168 |
| 2,301,213 A * | 11/1942 | Kang | A01M 7/005 |
| | | | 239/162 |

(Continued)

FOREIGN PATENT DOCUMENTS

WO WO2015154027 10/2015

*Primary Examiner* — Arthur O Hall
*Assistant Examiner* — Adam J Rogers
(74) *Attorney, Agent, or Firm* — Skaar Ulbrich Macari, P.A.

(57) ABSTRACT

A movable agricultural product applicator system for dispensing various agricultural-related products along the ground surface of agricultural crops is provided. The application system provides a hose assembly interconnecting a supporting boom and an applicator, wherein the applicator drags along the ground surface dispensing product as the supporting boom moves by a carrier. The application system may include a swivel connection facilitating a rotational and pivotal connection of the hose assembly to the supporting boom, wherein a mounting assembly removably mounts the application system to the supporting boom. The hose assembly is designed with bending properties that enable the applicator to self-center and locate rows between crops as it is being dragged along the ground surface, as well as enable the applicator to surf above obstacles.

20 Claims, 7 Drawing Sheets

(56) References Cited

U.S. PATENT DOCUMENTS

| | | | | |
|---|---|---|---|---|
| 2,381,649 A | * | 8/1945 | Dalton | A01M 7/0042 |
| | | | | 141/18 |
| 2,575,521 A | * | 11/1951 | Ireland | A01M 7/0075 |
| | | | | 16/19 |
| 2,770,493 A | * | 11/1956 | Fieber | A01M 7/00 |
| | | | | 239/168 |
| 3,143,146 A | * | 8/1964 | Kennedy | B67D 7/002 |
| | | | | 138/107 |
| 3,515,315 A | | 6/1970 | Kidd | |
| 3,625,428 A | * | 12/1971 | Mecklin | A01M 7/005 |
| | | | | 239/166 |
| 3,913,836 A | * | 10/1975 | Stevenson | A01M 7/0089 |
| | | | | 239/166 |
| 4,641,781 A | * | 2/1987 | McCrea | A01M 7/0064 |
| | | | | 239/159 |
| 4,784,324 A | * | 11/1988 | DeWitt | B05B 15/08 |
| | | | | 239/165 |
| 5,326,030 A | * | 7/1994 | Benest | A01M 7/0014 |
| | | | | 239/1 |
| 5,481,815 A | * | 1/1996 | Murphy | B09C 1/00 |
| | | | | 239/163 |
| 6,453,832 B1 | | 9/2002 | Schaffert | |
| 9,167,745 B2 | | 10/2015 | Muff | |
| 2013/0043326 A1 | * | 2/2013 | Muff | A01C 23/028 |
| | | | | 239/159 |

* cited by examiner

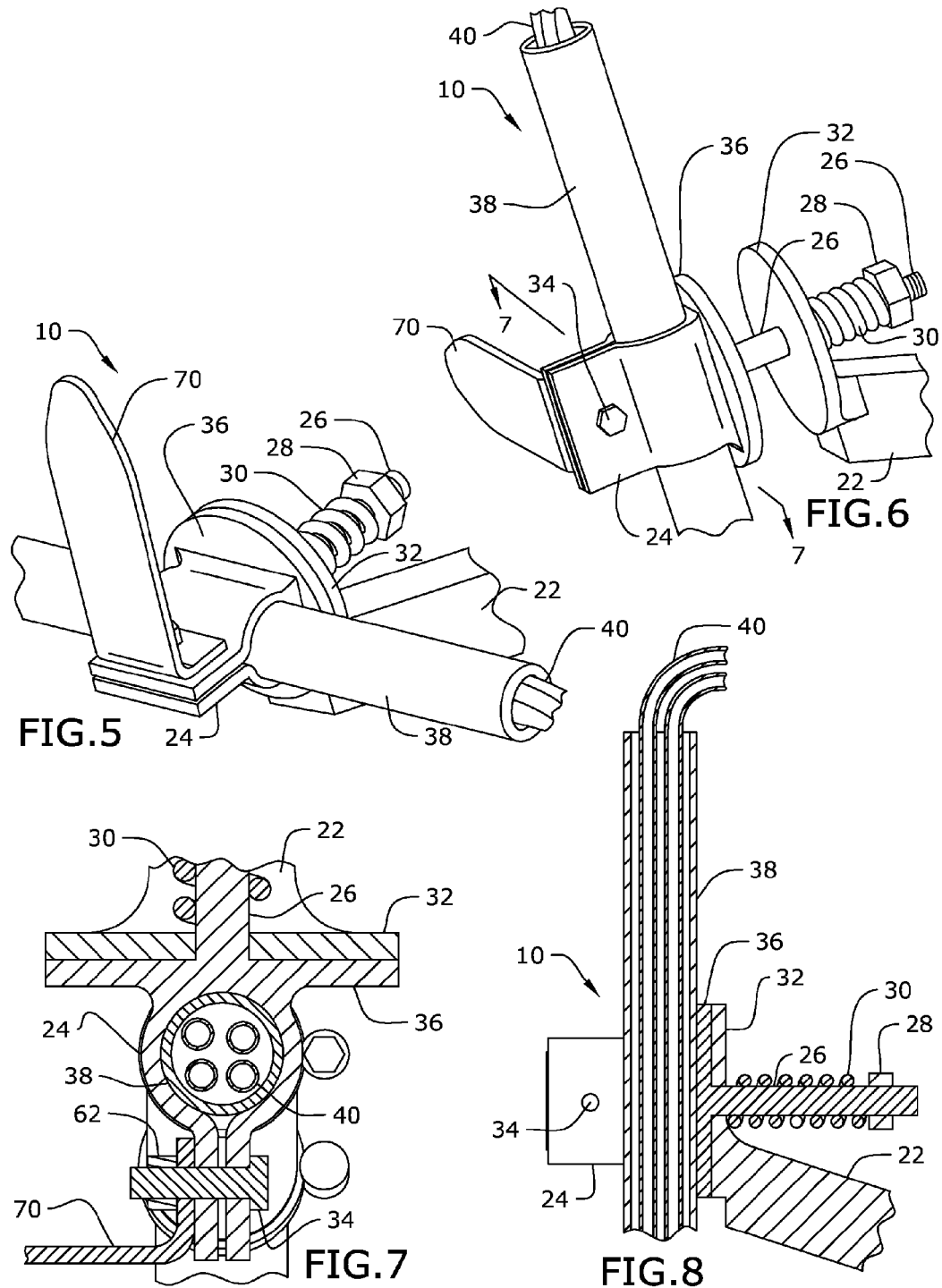

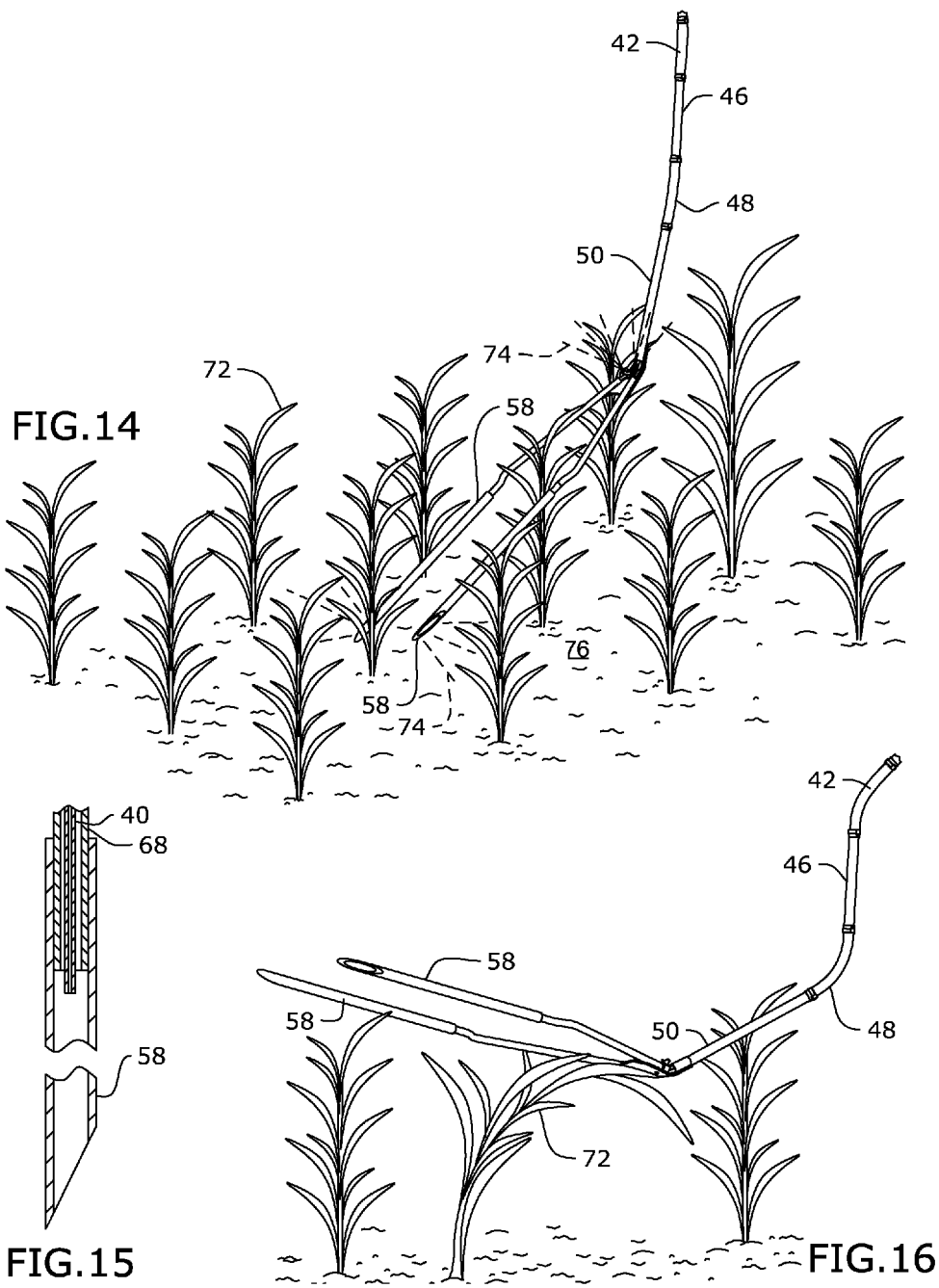

AGRICULTURAL CROP APPLICATION SYSTEM

PRIORITY

This application is a continuation application of U.S. application Ser. No. 14/931,842, filed on Nov. 3, 2015, which is hereby incorporated herein by reference in its entirety and which claims the benefit of priority of U.S. provisional application No. 62/074,217, filed 3 Nov. 2014, the contents of which are also herein incorporated by reference in its entirety.

BACKGROUND

The present invention relates to agricultural product application system and, more particularly, a movable agricultural product applicator system for dispensing various agricultural-related products along the ground surface of agricultural crops.

Current agricultural applicators are inefficient because the weight and rigidity of their applicator and delivery apparatus as well as these components' connection with their supporting boom causes at least the following problems: crop damage during use, damage to the applicator as it traverses varied terrain, attachment to and removal of the boom to the applicator and/or delivery apparatus is time-consuming, poor placement of the applicator relative to the boom and the crops, and the imposition of limits on the width of the boom.

As can be seen, there is a need for a movable agricultural product applicator system for dispensing various agricultural-related products along the ground surface of agricultural crops so as to overcome the above-mentioned problems.

SUMMARY

In one aspect of the present invention, a system for dispersing product along a ground surface of a field of crops using a mobile supporting boom spanning portions of the field of crops includes a hose assembly extending from a proximal end to a distal end; a swivel connection rotatably connecting the proximal end to the supporting boom, wherein the swivel connection is movable from a retracted position to an extended position; and an applicator connected to the distal end, whereby the applicator drags along the ground surface.

In another aspect of the present invention, system for dispersing product along a ground surface of a field of crops using a mobile supporting boom spanning portions of the field of crops having a hose assembly extending from a proximal end to a distal end, wherein the hose assembly includes a plurality of tubular components, wherein at least one of the plurality of tubular components extends along a longitudinal axis, and wherein the at least one of the plurality of tubular components is adapted to bend about the longitudinal axis in any direction; a swivel connection rotatably connecting the proximal end to the supporting boom, wherein the swivel connection is movable from a retracted position to an extended position, and wherein the swivel connection includes a boom extension plate interconnecting the hose assembly and the supporting boom, wherein the boom extension plate forms a bearing hole; a tube bracket joined to a plate post, wherein the tube bracket attaches to the proximal end, wherein the plate post extends through the bearing hole so that a protruding portion of the plate post is provided; and a spring disposed on the protruding portion so as to bias the swivel connection in the retracted position; a hang hook connected to the tube bracket; an applicator connected to the distal end; and a mounting assembly for removably securing the swivel connection to the supporting boom, wherein the swivel connection is rotatable so that a portion of the applicator can be supported by the hang hook of an adjacent tube bracket.

These and other features, aspects and advantages of the present invention will become better understood with reference to the following drawings, description and claims.

BRIEF DESCRIPTION OF THE DRAWINGS

FIG. 5 is a detailed perspective view of an exemplary embodiment of the present invention, demonstrating rotation to a rotated configuration;

FIG. 6 is a detailed perspective view of an exemplary embodiment of the present invention, demonstrating an extended configuration;

FIG. 7 is a section detail view of an exemplary embodiment of the present invention, taken along line 7-7 of FIG. 6;

FIG. 8 is a section detail view of an exemplary embodiment of the present invention, taken along line 8-8 of FIG. 3;

FIG. 14 is a perspective view of an exemplary embodiment of the present invention, shown in use;

FIG. 15 is a section detail view of an exemplary embodiment of the present invention, taken along line 15-15 of FIG. 2;

FIG. 16 is a perspective view of an exemplary embodiment of the present invention, shown in use;

DETAILED DESCRIPTION

Figure 1:
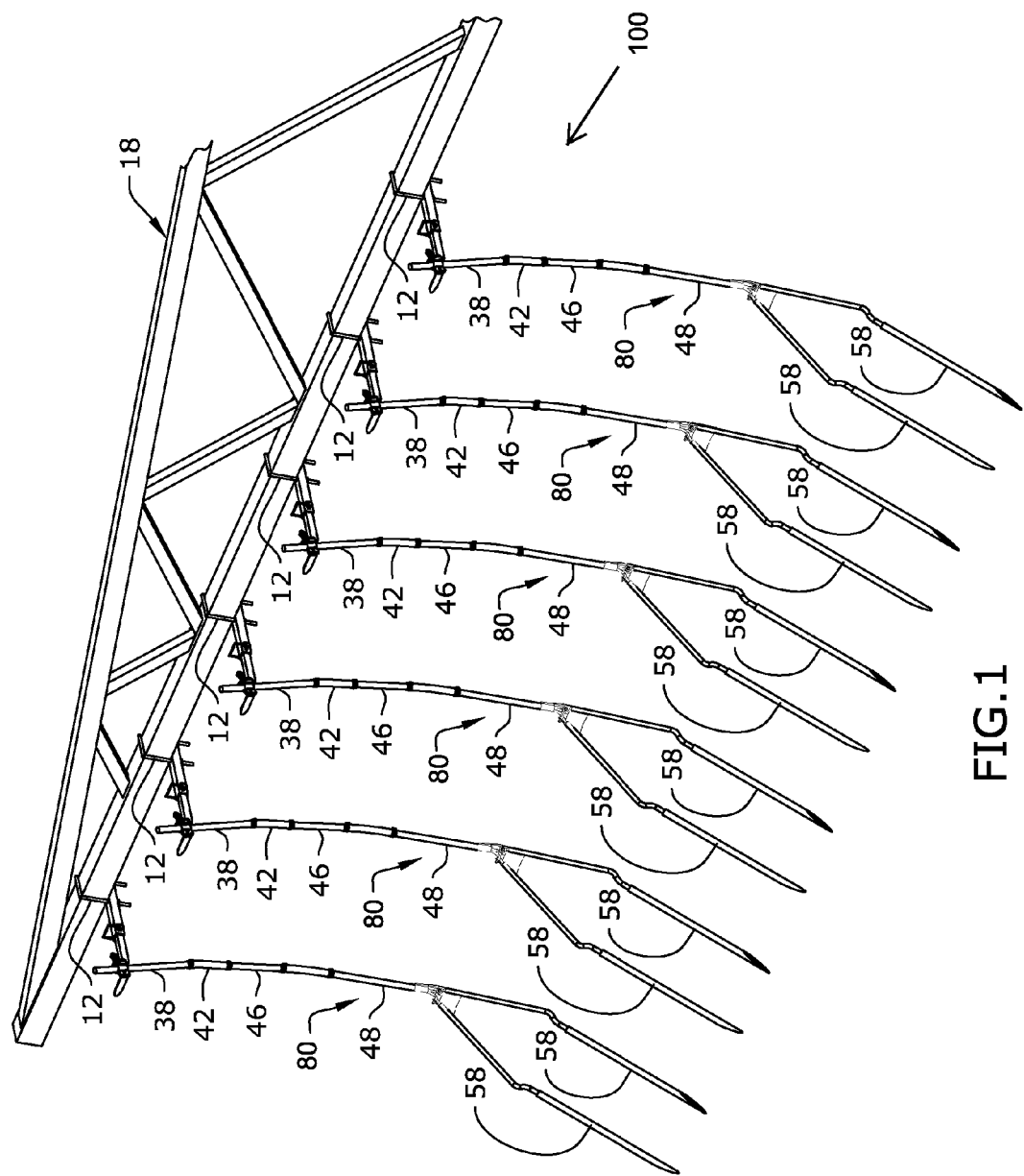
FIG. 1 is a perspective view of an exemplary embodiment of the present invention, shown in an exemplary configuration in use.
Figure 2:
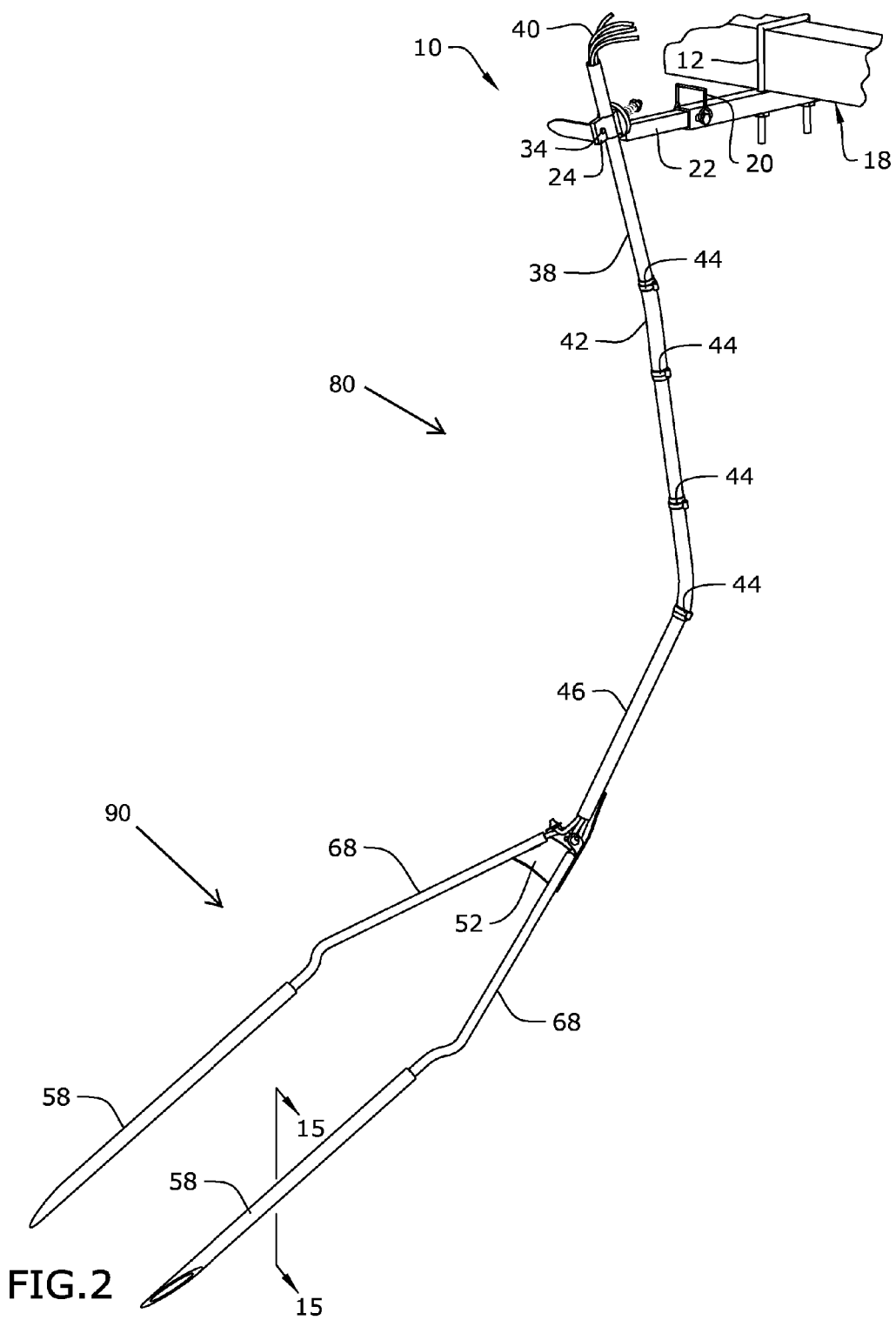
FIG. 2 is a perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a movable agricultural product applicator system for dispensing various agricultural-related products along the ground surface of agricultural crops. The application system provides a hose assembly interconnecting a supporting boom and an applicator, wherein the applicator drags along the ground surface dispensing product as the supporting boom spans across the crop field as it is moved by a carrier. The application system may include a swivel connection facilitating a rotational and pivotal connection of the hose assembly to the supporting boom, wherein a mounting assembly removably mounts the application system to the supporting boom. The hose assembly is designed with bending properties that enable the applicator to self-center and locate rows between crops as it is being dragged along the ground surface, as well as enable the applicator to surf above obstacles.

Referring to FIGS. 1 through 18, the present invention may include an agricultural product application system 100 for dispensing various agricultural-related products 74 along the ground surface 76 of agricultural crops 72. The product 74 may be fluids, gases, or solid/particulate, such as water, insecticide, herbicide or fertilizer. The application system 100 may include a hose assembly 80 interconnecting a supporting boom 18 and an applicator 90, wherein the applicator 90 drags along the ground surface 76 dispensing the product 74 as the supporting boom 18 is moved by a carrier. The application system 100 may include a swivel connection 10 enabling a rotational and pivotal connection of the hose assembly 80 to the supporting boom 18, wherein a mounting assembly 78 removably mounts the application system 100 to the supporting boom 18. The hose assembly 80 is designed with bending properties that enable the applicator 90 to self-center and locate rows between crops 72 as it is being dragged along the ground surface, as well as enable the applicator to surf above obstacles.

Figure 4:
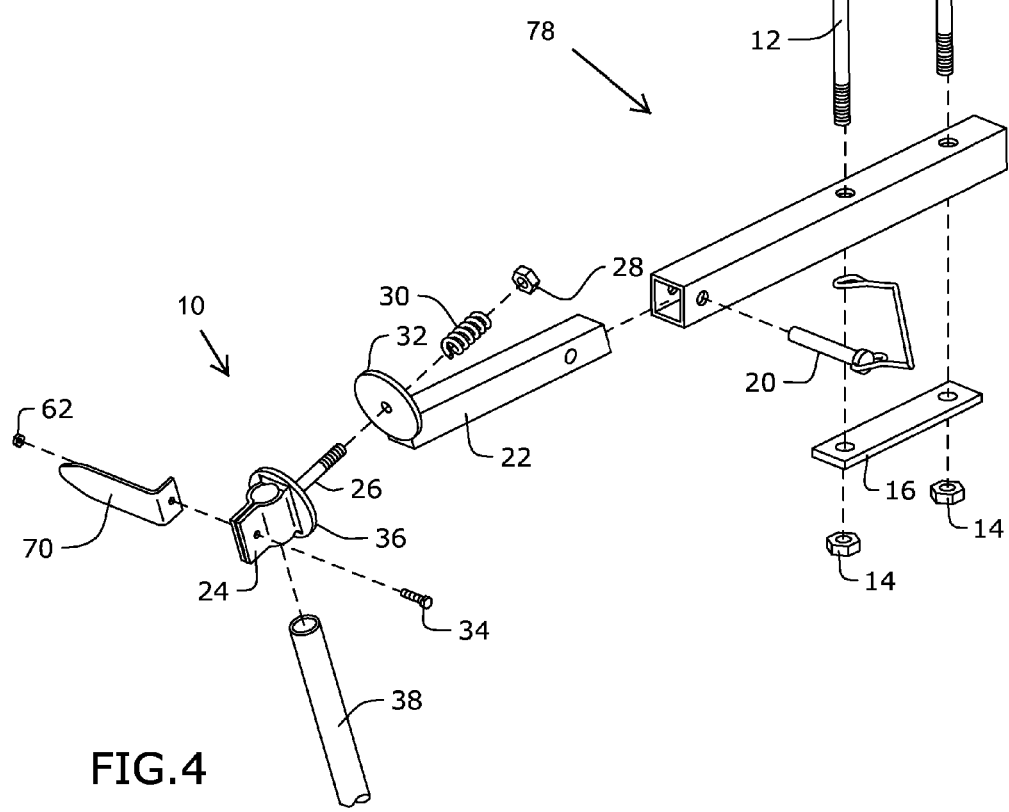
FIG. 4 is a detailed exploded view of an exemplary embodiment of the present invention.
Figure 9:
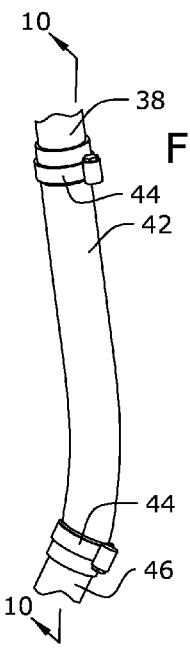
FIG. 9 is a perspective detail view of an exemplary embodiment of the present invention.
Figure 10:
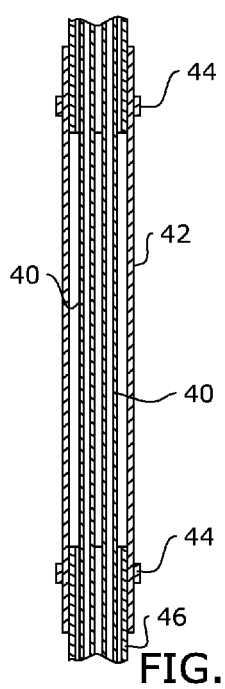
FIG. 10 is a section detail view of an exemplary embodiment of the present invention, taken along line 10-10 of FIG. 9.

The mounting assembly 78 may interconnect the hose assembly 80 and the applicator 90 to the supporting boom 18. The mounting assembly 78 may enable an extendable connection between the hose assembly 80 and the supporting boom 18. The mounting assembly 78 may include a boom extension 21, a first fastener 12—such as a u-clip bolt, for removably securing the boom extension 21 the supporting boom 18—second fasteners 14 and a boom extension 21 to secure the first fastener 12 to the boom extension 21, as illustrated in FIG. 4. The mounting assembly 78 may facilitate a quick release attachment and detachment of the boom extension 21 to the supporting boom 18 for ready transportation and storage of the application system 100 or portions thereof.

An extendable connector 22 may telescopically slide into a cavity of the boom extension 21 so that the extendable connector 22 moves from a retracted position to an extended position, wherein the extended position may be secured by a retainer clip 20, as illustrated in FIG. 4.

Figure 3:
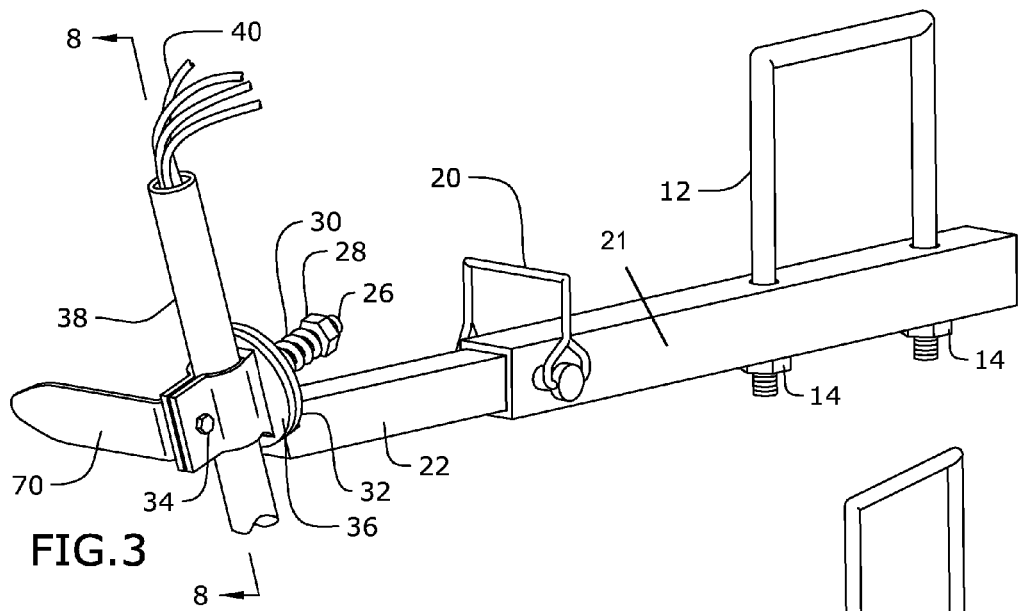
FIG. 3 is a detailed perspective view of an exemplary embodiment of the present invention.
Figure 17:
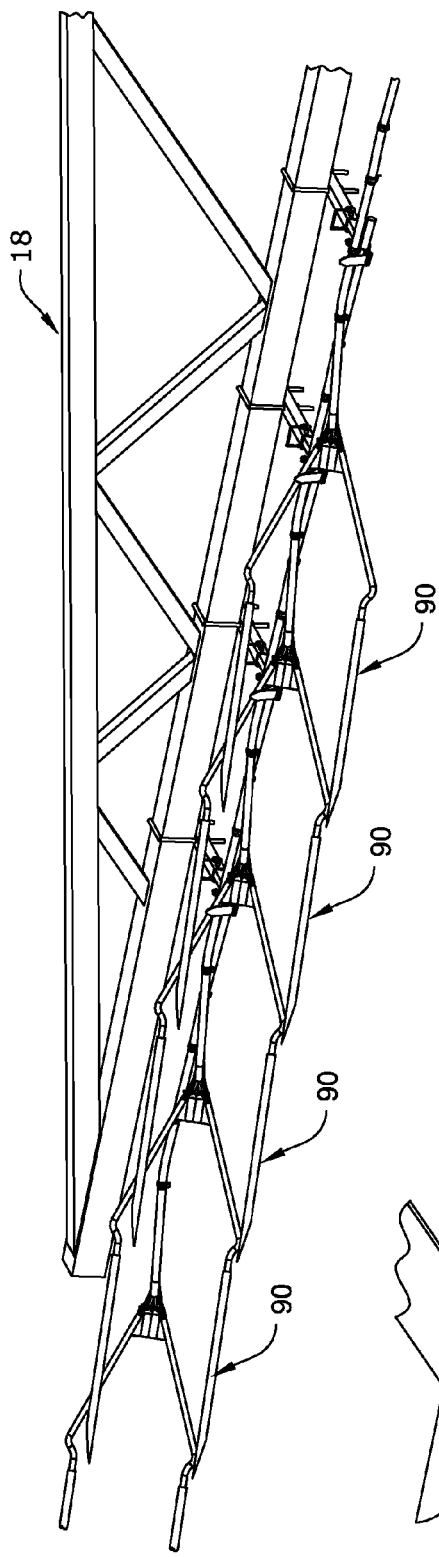
FIG. 17 is a perspective view of an exemplary embodiment of the present invention, shown in an exemplary rotated configuration in use.

The swivel connection 10 may interconnect the mounting assembly 78/extendable connector 22 and the hose assembly 80 so that the latter can rotate 360 degrees relative to a longitudinal axis of the former, whereby the hose assembly 80 is movable to a rotated configuration as illustrated in FIGS. 5 and 17. In certain embodiments, the swivel connection 10 may include a boom extension plate 32 and an opposing tube plate 36, wherein the tube plate 36 provide a plate post 26 perpendicularly and centrally joined thereto so that the plate post 26 extends to rotatably engage and journal through a centrally disposed bearing hole of the boom extension plate 32, as illustrated in FIGS. 3 and 4. The portion of the plate post 26 that protrudes through the bearing hole of the boom extension plate 32 may be threaded so that a threaded fastener 28 may be secured thereto. A spring 30 may be disposed along the protruding portion of the plate post 26 so as to be sandwiched between the threaded fastener 28 and the extension plate 32, thereby spring biasing the hose assembly 80 in a contracted configuration, as illustrated in FIGS. 3 and 5, yet movable to an extended configuration, as illustrated in FIG. 6. Such spring biasing allows the hose assembly 80 to pivot or flex temporarily to the extended configuration, such as when colliding with crops 72 or a terrain 76 of a higher elevation, so as to be urged back to the biased contracted configuration when no longer loaded by the force of such resistance, avoiding damage to the hose assembly 80, attached applicator 90, and/or crops 72 in such situations. Accordingly, the hose assembly 80 may both rotate about the longitudinal axis of the extension connector 22 as well as flex/pivot along the same longitudinal axis.

Figure 18:
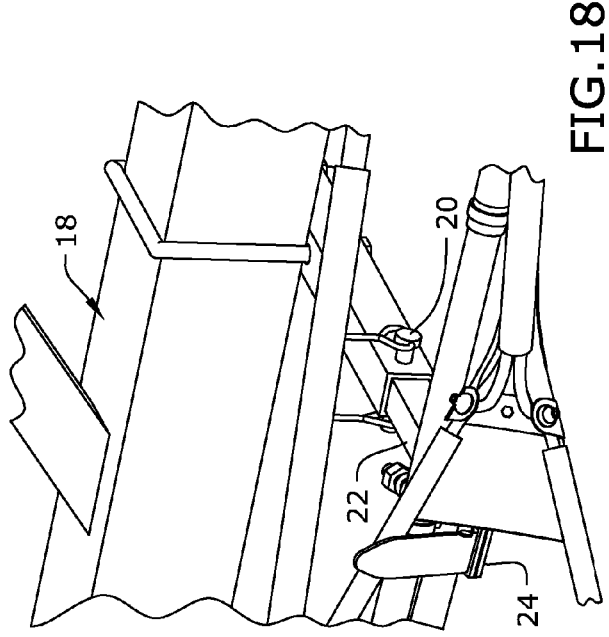
FIG. 18 is a perspective detail view of an exemplary embodiment of the present invention.

The tube plate 36 may be joined to a tube bracket 24 dimensioned and adapted to slidably receive and secure to the hose assembly 80 or a portion thereof, such as an upper rigid tube 38. A hang hook 70 may be connected to the tube plate by the same means for securing the rigid tube 38, for example by a lock fastener 34 and nut 62. The hang hook 70 may be disposed so as to support a portion of the hose assembly 80 when in the rotated configuration, as illustrated in FIG. 18.

The hose assembly 80 may include a plurality of modular tubular components 82 removably attachable to each other in various configurations by a plurality of clamps 44 so that the plurality of modular tubular components 82 slidably receive a plurality of product delivery hoses 40, protecting said delivery hoses 40 as they fluidly interconnect a product source and the applicator 90. The product delivery hoses 40, the hose assembly 80, the applicator 90, and components thereof are made of lightweight, durable and resilient material. In certain embodiments, the plurality of interchangeable modular tubular components 82 may include the upper rigid tube 38, an upper flex hose 42, a middle rigid tube 46, a middle flex hose 48 and a lower rigid tube 50 sequentially interconnected by the plurality of clamps 44. The flex hoses 42, 48 are adapted to be bend about their longitudinal axis in any direction so that when portions of the hose assembly 80 encounters resistance—be it the crops 72 or obstacles like terrain 76 of a higher elevation—at least one flex hose 42, 48 bends so that the applicator 90 lifts up against said resistance, as illustrated in FIG. 16. Such bending and lifting or "surfing" prevents crop damage and damage to the applicator 90 hitting obstacles. This bending property or flexibility also facilitates the applicator 90 to "find" the rows between the crops 72 as the applicator 90 moves along the path of least resistance—as compared to the more resistive crops 72 themselves. Likewise, this bending property or flexibility enables the hose assembly 80 and the attached applicator 90 to be "self-centering" as the applicator 90 drags along the terrain 76, much like dragging a broom is self-centering, because the path of least resistance is a path generally aligned and in tow with the hose assembly 80.

Figure 11:
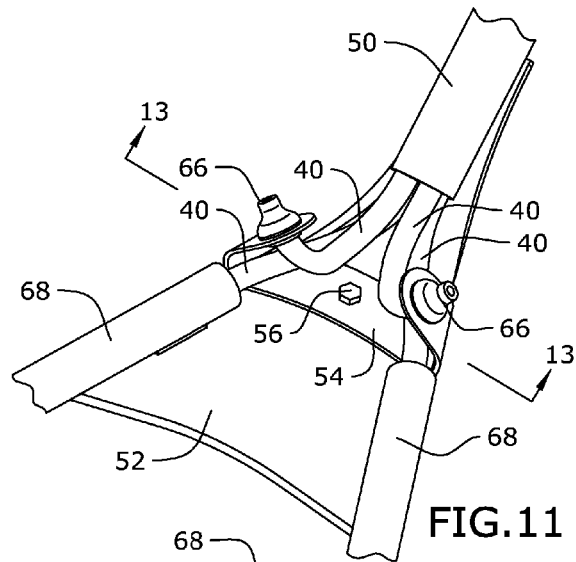
FIG. 11 is a perspective detail view of an exemplary embodiment of the present invention.
Figure 12:
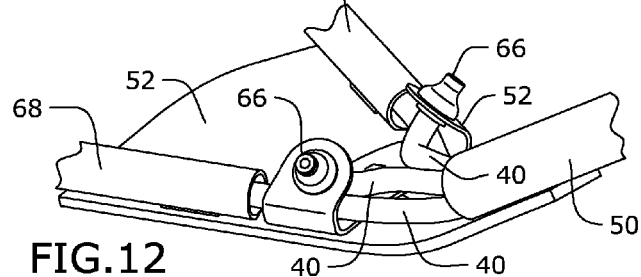
FIG. 12 is a perspective detail view of an exemplary embodiment of the present invention.
Figure 13:
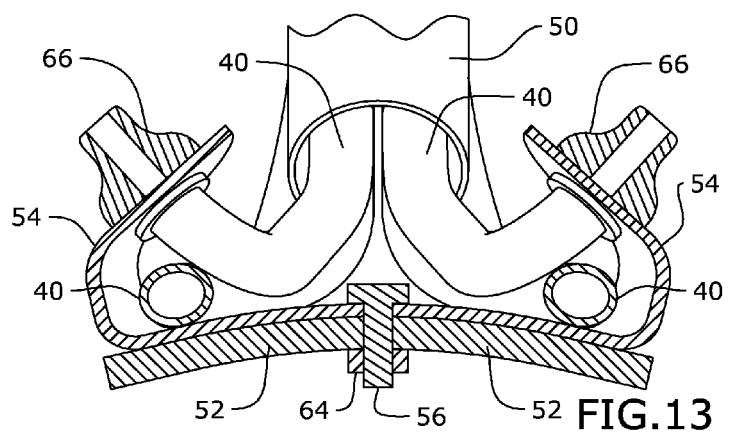
FIG. 13 is a section detail view of an exemplary embodiment of the present invention, taken along line 13-13 of FIG. 11.

The applicator 90 may be attached to the distal end of the hose assembly 80 by a reinforcement plate 52. The reinforcing plate 52 may form two rigid tubes 68 wherein the two rigid tubes are divergently oriented. The reinforcement plate 52 may be dimensioned and adapted to support the plurality of product delivery hoses 40 and/or lower rigid tube 50. The plurality of product delivery hoses may transition from the lower rigid tube 50 to the applicator 90, wherein at least one product delivery hose 40 continues through each rigid tube 68 and where two product delivery hoses 40 terminate at opposing nozzles 66 between the rigid tubes 68 and the lower rigid tube 50, as illustrated in FIGS. 11-13. A nozzle accessory bracket 54 may be connected to the reinforcement plate 52 by a bracket fastener 56 and nut 64 so as to support the opposing nozzles 66. Each distal end of the two rigid tubes 68 may connect to angle-cut tubes 58, wherein each continuing product delivery hose 40 terminates therein, as illustrated in FIG. 15. The distal end of each angle-cut tube 58 may be dimensioned and adapted to provide a directional tip for delivering the product 74.

A method of using the present invention may include the following. The application system 100 disclosed above may be provided. A user may mount the application system 100 to the boom 18 using the mounting assembly 78, wherein the boom 18 is connected to heavy duty carrier (not shown), such as a tractor. Then the user may connect the plurality of product delivery hoses 40 protruding through the upper rigid tube 38 to the product source, possibly also located on the heavy duty carrier. Then the user may adjust the length of the hose assembly 80 by selectively interconnecting specific plurality of modular tubular components 82 so that the applicator 90 drags along the terrain 76 when in use. In certain embodiments, the applicator 90 may drag along at an approximately 60 degree angle to the terrain 76, as illustrated in FIG. 14. Then the user may move the heavy duty carrier adjacent to the agricultural crops 72 and use the application system 100 to drag the applicators 90 through the crop rows so as to dispense the product 74 along the ground surface 76 of the crops 72, as illustrated in FIG. 14.

It should be understood, of course, that the foregoing relates to exemplary embodiments of the invention and that modifications may be made without departing from the spirit and scope of the invention as set forth in the following claims.

What is claimed is:

1. A system for dispersing product on a field of crops using a mobile supporting boom spanning portions of the field of crops, comprising:
   a product delivery hose assembly extending downwardly from the boom, the product delivery hose assembly having a proximal end and a distal end;
   at least one tube operatively coupled to the boom, the at least one tube comprising a plurality of tube segments operatively coupled together to permit flexing of the at least one tube, the at least one tube having an interior for retaining the product delivery hose assembly extending there through;
   at least one nozzle coupled to and in fluid communication with the distal end of the product delivery hose assembly;
   a bracket disposed proximate to the distal end of the product delivery hose assembly to position the at least one nozzle in an angled position; and
   a hang hook connected to the at least one tube, the hang hook being adapted to retain an adjacent at least one tube when the product delivery hose assembly is not being used,
   wherein product flowing through the product delivery hose assembly is dispersed through the at least one nozzle in a upward direction to spray a field of crops.

2. The system of claim 1, wherein the plurality of tube segments comprise alternating rigid and flexible tube segments operatively coupled together.

3. The system of claim 2, further comprising at least one coupler adapted to couple the rigid and flexible tube segments together.

4. The system of claim 2, further comprising a spring swivel connection rotatably connecting a proximal end of the at least one tube to the supporting boom, wherein the swivel connection is movable from a retracted position to an extended position.

5. The system of claim 4, wherein the spring swivel connection further comprises:
   a boom extension plate interconnecting the product delivery hose assembly and the supporting boom, wherein the boom extension plate forms a bearing hole; and
   a tube bracket joined to a plate post, wherein the tube bracket attaches to the proximal end, wherein the plate post extends through the bearing hole so that a protruding portion of the plate post is provided, and wherein the spring is disposed on the protruding portion.

6. The system of claim 1, further comprising an applicator connected to the distal end to direct a flow of product along a ground surface.

7. The system of claim 6, wherein the applicator further comprises two applicator tubes that diverge, and wherein each applicator tube is in fluid communication with the at least one product delivery hose.

8. The system of claim 6, wherein the applicator further comprises two applicator tubes that diverge, and wherein the two applicator tubes are adapted to receive a portion of at least one product delivery hose.

9. The system of claim 7, further comprising two ground tubes, each ground tube being adapted to receive a distal end of an applicator tube, wherein each ground tube is adapted to direct a flow of product onto a ground surface.

10. A product dispenser adapted to disperse a product on a field of crops using a mobile supporting boom spanning portions of the field of crops, comprising:
    a hose assembly extending from a proximal end to a distal end, wherein the hose assembly comprising a plurality of tubular components, wherein at least one of the plurality of tubular components extends along a longitudinal axis, and wherein the at least one of the plurality of tubular components is adapted to bend about the longitudinal axis in any direction;
    at least one nozzle operatively coupled to the distal end of the product delivery hose assembly adapted to spray product on the field of crops;
    a swivel connection rotatably connecting the proximal end to the supporting boom, wherein the swivel connection is movable from a retracted position to an extended position, and wherein the swivel connection comprises:
       a boom extension plate interconnecting the hose assembly and the supporting boom, wherein the boom extension plate forms a bearing hole;
       a tube bracket joined to a plate post, wherein the tube bracket attaches to the proximal end, wherein the plate post extends through the bearing hole so that a protruding portion of the plate post is provided; and
       a spring disposed on the protruding portion so as to bias the swivel connection in the retracted position;
    a hang hook connected to the tube bracket, the hang hook being adapted to retain an applicator when the product dispenser is not being used;

an applicator connected to the distal end and extending beyond the at least one nozzle; and a mounting assembly for removably securing the swivel connection to the supporting boom.

11. The dispenser of claim 10, further comprising an extension connector interconnecting the supporting boom and the boom extension plate.

12. The dispenser of claim 11, further comprising a boom arm connected to the supporting boom, wherein the boom arm is telescopically connected to the extension connector, positionable in an extended position and a retracted position.

13. The dispenser of claim 10, wherein the mounting assembly comprises a u-clip bolt dimensioned and adapted to removably secure the boom arm to the supporting boom, wherein the u-clip bolt slides out of the boom arm.

14. A product dispersing assembly used on a field of crops utilizing a mobile supporting boom having a reservoir containing product that spans a portions of the field of crops, comprising:
- a product hose assembly extending from a proximal end to a distal end, the proximal end being in fluid communication with the reservoir containing the product;
- a tube assembly having an interior to receive and protect the product hose assembly from damage, the tube assembly comprising:
  - at least one upper tubular component extending along a longitudinal axis to protect a portion of the product hose assembly hanging from the boom, and wherein the at least one upper tubular component is adapted to bend about the longitudinal axis in any direction;
  - a plate coupled to a distal end of the upper tubular component;
  - at least a pair of diverting tubes coupled to the plate and extending angularly away from the upper tubular component, the product hose assembly extending through a portion of the at least pair of diverting tubes;
  - a hang hook connected to the at least one upper tube component, the hang hook being adapted to retain an adjacent at least one tube assembly when the product delivery hose assembly is not being used; and
- at least one nozzle fluidly coupled to a distal end of the product hose assembly to spray product on the field of crops, the at least one nozzle being disposed between the upper tubular component and the at least a pair of diverting tubes.

15. The assembly of claim 14, wherein the upper tubular component is segmented into a plurality of tubular components flexibly coupled together to permit bending of the upper tubular component.

16. The assembly of claim 15, further comprising at least one flex hose coupled to and extending between the tubular components to permit the flexing of the upper tubular component.

17. The system of claim 14, further comprising a bracket coupled to the plate and the at least one nozzle.

18. The assembly of claim 14, further comprising a swivel connection rotatably connecting the proximal end to the supporting boom, wherein the swivel connection is movable from a retracted position to an extended position.

19. The assembly of claim 18, wherein the swivel connection comprises:
- a boom extension plate interconnecting the hose assembly and the supporting boom, wherein the boom extension plate forms a bearing hole;
- a tube bracket joined to a plate post, wherein the tube bracket attaches to the proximal end, wherein the plate post extends through the bearing hole so that a protruding portion of the plate post is provided; and
- a spring disposed on the protruding portion so as to bias the swivel connection in the retracted position.

20. The assembly of claim 19 further comprising a mounting assembly for removably securing the swivel connection to the supporting boom.

* * * * *